Figure 1:
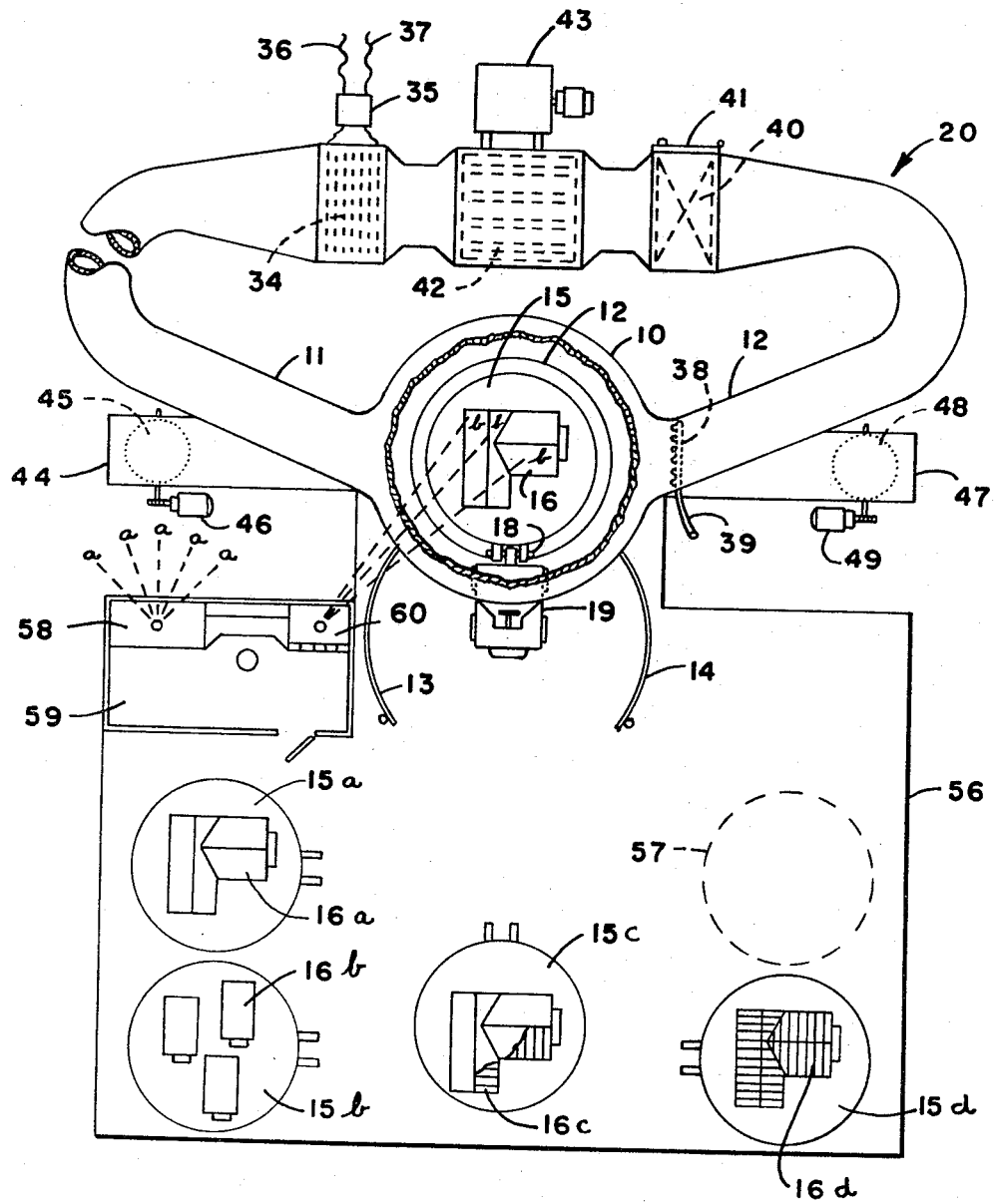

June 27, 1967   J. V. FITZGERALD   3,327,536
ACCELERATED ENVIRONMENTAL TESTING OF LARGE STRUCTURES
Filed Nov. 2, 1964   3 Sheets-Sheet 1

*INVENTOR.*
JOHN V. FITZGERALD
BY
ATTORNEY

June 27, 1967 J. V. FITZGERALD 3,327,536
ACCELERATED ENVIRONMENTAL TESTING OF LARGE STRUCTURES
Filed Nov. 2, 1964 3 Sheets-Sheet 2

INVENTOR.
JOHN V. FITZGERALD
BY
ATTORNEY

United States Patent Office 3,327,536
Patented June 27, 1967

3,327,536
ACCELERATED ENVIRONMENTAL TESTING OF LARGE STRUCTURES
John V. Fitzgerald, 106 Norris Ave., Metuchen, N.J. 08840
Filed Nov. 2, 1964, Ser. No. 408,234
12 Claims. (Cl. 73—432)

This invention deals with the accelerated environmental testing of large structures, and with novel apparatus therefor. More specifically, it relates to the testing, under accelerated environmental conditions, of large structures, such as full-size buildings, in a closed chamber provided with a tunnel-type of closed system, wherein accelerated atmospheric conditions can be duplicated and impressed upon the enclosed building.

At the present time, accelerated weather tests have been limited to the testing, in a small apparatus, such as the "Weatherometer," of small components and specimens of different materials and pieces of structures used in the construction of the large units. Such specimens are subjected to specific tests, such as ultra violet light exposure, freezing, and wet-dry treatment. From the results of these tests, there have been made predictions as to the performance of such buildings under actual long time weather service conditions. Unfortunately, however, performance in practice has not, in many, if not most, cases, yielded results conforming to the conclusions reached when based on such laboratory data of the small items tested. Thus, there has been repeatedly expressed, an urgent need for some other more conclusive testing means for large structures, but none has been developed. In the "Symposium on Conditioning and Weathering," presented at the American Society of Testing Materials in New York on June 24, 1952, various experts discussed this problem. For example, Burns stated (p. 1) that "although the weather has been with us for a long time all efforts to tame it have been singularly unsuccessful and all attempts to reproduce it quite discouraging to all but the intellectually stalwart." After discussing the small scale testing heretofore referred to, Haynes (p. 23) concluded that: "Although some progress is being made in the study of micro-climatology, a great amount of work still remains to be done." Reinhart (p. 42) remarks that: "Accelerated weathering testing is in an unsatisfactory state". And then further: "The hope of materials technologists for many years has been to make accelerated services and weathering tests on various materials in the laboratory that will produce in a short time the same results that are produced in the materials during long-time use." Sawyer (p. 93) adds to this his opinion that: "It can safely be said that no present laboratory test reproduces all of the weather changes that occur in normal weather." It is thus apparent that the industry is searching for some means of obtaining effective results on actually-simulated weathering of buildings.

According to the present invention, there is provided an enclosure wherein an entire building may be rolled in on a platform, and wherein accelerated weathering of the structure can be effected in a closed system, using computer control, if desired, the closed system comprising a large duct, wherein substantially all of the weather-producing equipment is contained.

Figure 2:
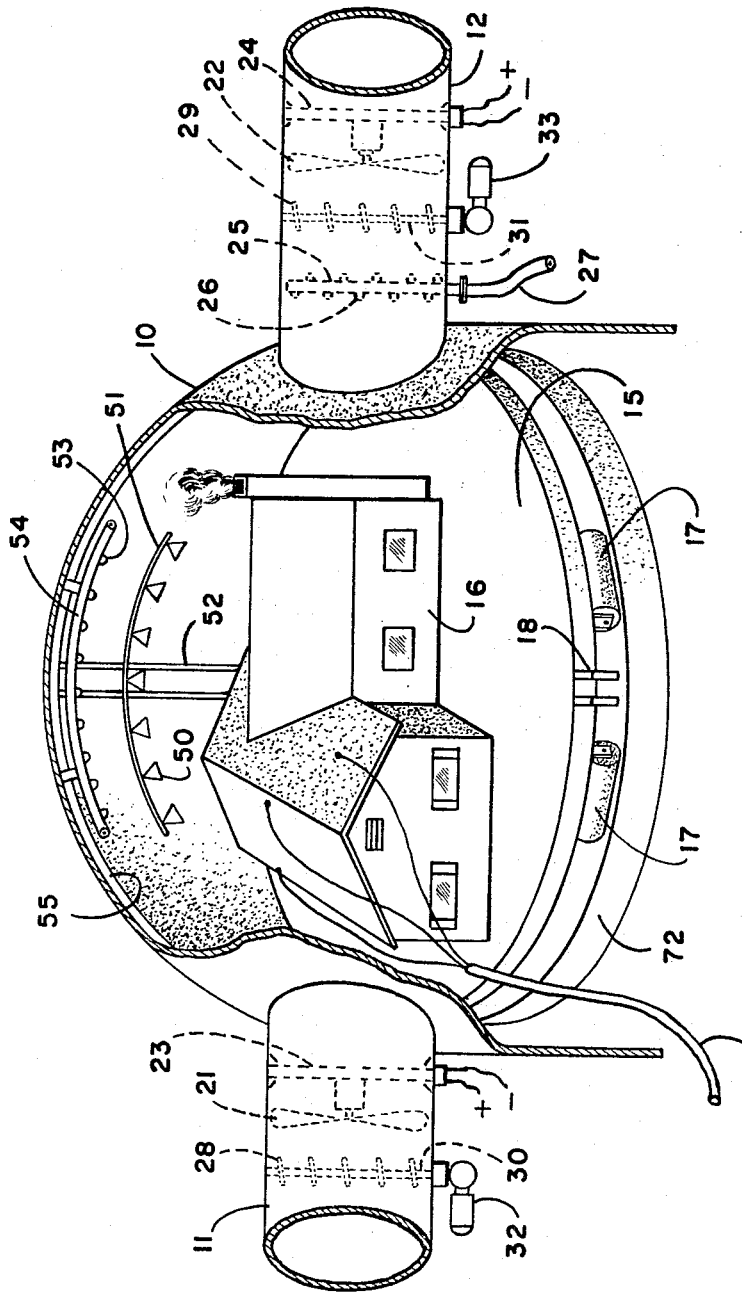
Figure 3:
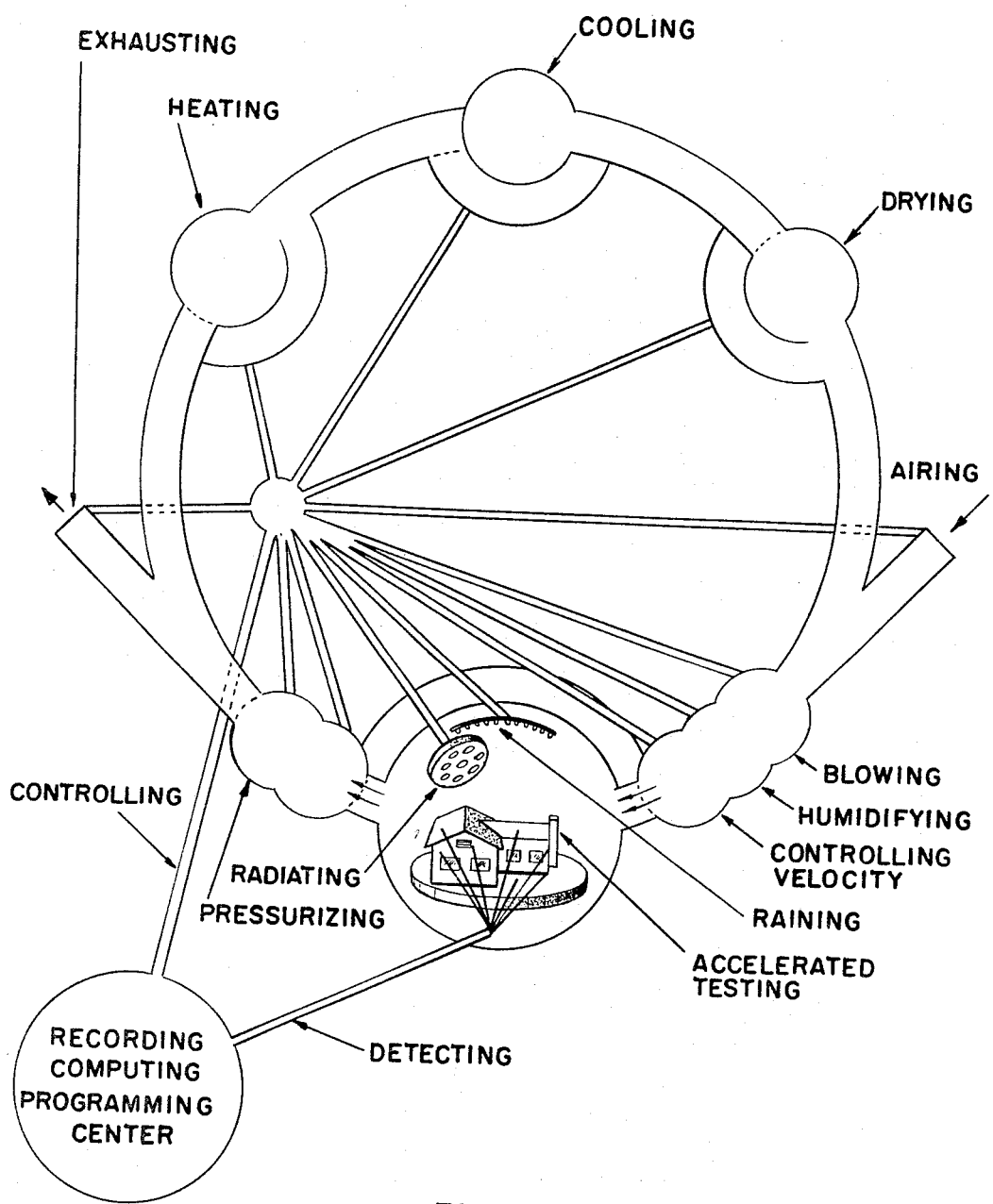

The invention will be more readily understood by reference to the accompanying drawings in which a preferred embodiment is described, and in which FIGURE 1 presents a schematic top view of an environment accelerator of the present invention with the top of the testing chamber cut off and a portion of the duct cut away. FIGURE 2 depicts a side view of the testing chamber portion with a portion of the chamber wall cut away to show the interior thereof. FIGURE 3 illustrates a schematic diagram depicting the functional inter-relationships of the various elements employed in the testing programs. Similar numerals refer to similar parts in the various figures.

Referring again to the drawings, it will be noted that the invention includes a testing chamber 10, preferably of generally hemispherical design, integrally connected to large duct 11 on one side and similar duct 12 on the other side. Chamber 10 has a platform 72 which may be raised or lowered and/or rotated, as desired. The forward portion of chamber 10 is provided with doors 13 and 14 which may be opened to permit passage therethrough of a base 15, on which a building 16 is placed for accelerated testing thereof. Base 15 is provided with casters 17, and with a coupling 18 to which may be attached truck 19 used for moving the base and its load.

Ducts 11 and 12 are terminal ends of a continuous duct system, designated generally as 20, and serving to circulate air (or other gas) which has been conditioned for the type of weather desired. Blower fans 21 and 22, mounted on supports 23 and 24, respectively, serve to circulate the air at the desired velocity to simulate wind, while a water pipe 25, provided with nozzles 26, serves to add humidity or to simulate rain, as desired. The water is fed into pipe 25 through hose 27. The velocity of the air also may be controlled by louvre-type shutters 28 and 29, mounted on supports 30 and 31, respectively. The shutters are actuated by electric motors 32 and 33, respectively.

Wind temperature may be increased by heating coils 34 having controls 35 and electrical leads 36 and 37. A fire spray stream may be generated from spray nozzles 38 which may be mounted in duct 12 ahead of water spray pipe 25. Fuel may be fed to the spray through line 39. A dryer, such as a silica gel unit 40 also may be installed in duct 20, and it may be inserted therein or removed therefrom via door 41. A refrigerating unit, having cooling coils 42 within duct 20, and compressor and other auxiliary equipment 43 outside of the duct, may also be installed.

Fan 21 may serve to exhaust air out of test chamber 10 and through discharge port 44, the latter being provided with a butterfly valve 45 operated by motor 46. Also, an inlet port 47 is provided for flushing the system with air, or supplying additional air to the system. It is likewise provided with butterfly valve 48 operated by motor 49. The sun is simulated by an array of ultra-violet and infra red lamps 50 mounted on support 51 which may be moved on tracks, such as channel member 52, enabling the sun effect to be radiated from horizon to zenith, and back, for example. Rain may be simulated by forcing streams of water from nozzles 53 in pipe 54, which streams may be directed in any direction by moving pipe 54 on a track, such as track 55.

In an adjoining building or parking space 56, are shown five base sites, from one of which, 57, was removed the base 15 by truck 19. Base 15a contains a newly-erected home 16a which is to be tested. Base 15b holds three small cottages 16b, also ready for testing. Base 15c supports a prototype house 16c which was partially destroyed by a severe experimental run in chamber 10. This house will be razed and replaced. Base 15d holds a partially-constructed home 16d which will be tested on completion.

Controls $a$, $a$, $a$ . . . $a$, of the various weather-generating elements are remotely controlled manually by a program, and also through a computer 58 disposed in control room 59. Probes $b$, $b$, $b$ . . . $b$, in the prototype building 16 measures the effects of the accelerated weather, which are recorded and fed into computer 60.

As can be seen from FIG. 3, the weather generator elements (W), the building prototype (B) and the control center (C) are connected to form a loop.

If we let $W_V'$ be a complex number describing wind velocity, then $B_S'$ will be the complex stress induced by $$\frac{\Sigma W'}{V,T,H}$$

as shown by a strain gauge. $B_T'$ may be the temperature in some part of the prototype, and $B_H'$ the moisture caused by $W_H'$. The concept of $C'$ can be understood best by referring to the amplified feedback theory. In the latter case, when a fraction of the energy in the plate circuit of an amplifier is inserted into the grid circuit, the amplifier is said to have feedback. When the voltage inserted into the grid circuit is 180° out of phase with the signal voltage acting on the grid, the feedback is called negative or degenerative. When the voltage inserted is in phase with the signal voltage, the feedback is positive or regenerative. Degenerative feedback reduces amplification but tends to result in a flat frequency response. Regenerative feedback, on the other hand, increases the amplification and, when the feedback is large enough, it leads to self-sustaining oscillation. However, positive feedback often is used for selective amplification at feedback levels below the level causing oscillation.

In the present case, $W_V'$ may describe a wind varying sinusoidally in velocity. Thus, $B_S'$ represents the sinusoidally-varying strain gauge signal from a stressed roof truss in a prototype metal military-type building, for example. $W_V'$ and $B_S'$ become related in the environmental accelerometer loop by a transfer function K. When $C_V'$ is zero, the control center merely delivers the wind $W_V'$ against the prototype building 16, and the wind's effect $B_S'$ is merely observed or recorded at the control center, $K = B_S'/W_V'$.

In order to accelerate the weather's destructive effects for a given peak wind velocity, the frequency is changed gradually. If it turns out, for example, that one particular frequency with a period of 10 seconds seems to induce the largest stress, then the control center automatically, by means of computer or by an observer, reads this, and by means of $C_V'$ operates $W_V'$ so as to maximize the resultant stresses in terms of frequency and amplitude. If, at a new amplitude level, the frequency requires change for maximum-induced stress, then this is read, and so on. The algebraic relation describing this operation may be written as follows:

$$B_S' = K(W_V' + C_V' B_S')$$

which specifies that the wind's effect is equal to the transfer function, times the product of the wind velocity, plus feed-back factor times the wind's effect. The product $C_V' B_S'$ may be correlated with the electronic loop gain.

The aforesaid operation of the three parts W, B and C of the environmental accelerator loop may be either positive or regenerative. It leads directly to accelerated or rapid destruction of the susceptible components of the prototype building 16. However, the analogy does not stop with the regenerative type of operation of this unit. Suppose, for example, it is desirable to isolate the effects of radiation $W_R'$ such as the effect of the hot sun and cold clear nights, but under cyclic wind conditions, as occur in certain deserts. In such case, the unit would be operated degeneratively with respect to solar radiation $W_R'$. The algebraic relation closely describing this degenerative operation would be $$B_S' = K(W_R' - C_V' B_S')$$

The operational concept of the present unit is understandable more readily when presented as analogous to an electronic amplifier with positive and negative feedback, as is done above. A computer is helpful to manage the operation at the control center. The presumably simple loop

becomes complex in detail because the part designated W includes wind variable in velocity, temperature, pressure, and humidity, plus variable radiation and rain. The part designated B includes an almost infinite number of configurations, materials, and instruments for detection, such as strain gauges, pressure gauges, humidity meters, deflectometers, thermocouples, vibration frequency and vibration level meters, as well as radiometers. However, B may be constrained not to exceed certain limits of temperature, stress, and humidity by means of air conditioners or heaters:

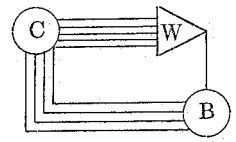

When in use, doors 13 and 14 are opened, and base 15, holding the building 16 to be tested, is rolled into test chamber 10 by means of truck 19. The height and direction of base 15 are adjusted. Then, the various probes (b) and testing instruments are attached to the building portions which are the subjects of the test, and the electrical cable 61 therefrom is led into computer room 59 for connection to reading instruments, computer, etc. Thereafter, the various weather-making elements are turned on from the control room 59, after doors 13 and 14 are closed. If the system is to be purged first, valve 48 is opened while valve 45 is closed, and fan 22 is started while shutters 28 and 29 are open. Fan 21 also may be turned on to blow in the same direction if additional speed is desired. After circulating the air through duct 20, valve 45 may be opened and the air is discharged to the outside. Purging of any area may be regulated by operation of the two fans and shutters (or doors), as required.

Thereafter, the weather elements, such as lamps 50, water nozzles 53, heater 34, water spray 26, fans 21 and 22 are set for the required weather operation and direction, and the test is monitored at the control room 59. If pressure is desired on building 16, shutters 28 may be closed while fan 22 is on at high speed. If a vacuum is desired, shutters 29 are closed, and fan 28 is set to blow away from test chamber 10. In cases where water is not used, drier 40 and/or refrigerator 42 may be put into operation, as operating conditions require.

FIGURE 3 depicts how the various weathering elements function in combination. The prototype house 16 is exposed to wind, rain and "sun," indicated as the functions of blowing, raining and radiating. The wind effect is modified by elements whose functions are depicted as humidifying, controlling velocity, pressurizing, heating, cooling and drying. Accelerated weather conditions are generated by controlling all of these functions at the recording, computing and programming center. The effects of the accelerated weather exposure on the house are detected and sent to the control center. What is illustrated in FIG. 3 is a control center for causing to be delivered accelerated or precisely-programmed extremes of weather onto a full size prototype test house, and means for detecting the effects of the weather, analyzing these effects, and using the data to intensify or modify the artificial weather and thereby increase the rate of degradation, or otherwise deliberately change the effects, or induce new ones. The by-pass around the test chamber in FIG. 3 enables air to be circulated until a large volume is very hot or very cold and which then can be suddenly redirected at the house when it is rolled into the test chamber.

Although the heater 34, cooler 42 and drier 40 are shown in series in FIG. 1, it is to be understood that they may be arranged in parallel in duct 20, if desired. Also, the test chamber may be a large vertical or cylindrical tank, rather than a hemisphere. It is possible to test items, such as lumber, glass, nails, paint, roofing, wiring and plumbing in various sections of duct 20 as desired, and doors may be made in said duct as entrances. By means of the present invention, wind velocity against and around house 16 may range from 0 to 250 miles per hour, for example. By changing the pitch of fans 21 and 22, at intervals, the air flow may be directed in gusts. Air pressure could be increased as much as 2 inches or more, or decreased, by use of the shutters and fans. Temperature of the wind may be cooled to as low as 100° F. by refrigerator 42, or heated to as high as 150° F. by means of heater 34, and humidity can be varied from 0 (by use of drier 40) to 100% by use of sprays 53 and 26. Overhead nozzles 53 can produce torrential rain in any direction at a rate of as much as 10 inches per hour, which water may be caught and recirculated.

As an example, the weather may be programmed to include winds with velocities, temperatures and humidities slightly in excess of those recorded by the U.S. Weather Bureau for the Boston geographical area. In the first tests, strains and vibrations caused by the wind are carefully analyzed, and a program is arranged to maximize them. A repeated cycle of heated air with desiccation, followed by driven rain and high velocity wind of gradually decreasing temperature would be found particularly destructive, but only to certain materials, such as paint and caulking and certain elements of construction, as where cross-bracing was lacking. Other materials, such as concrete, wood and metal, and parts of the construction where heavy roof shingles had four instead of two nails, and were also cemented down, would be noted to be almost indestructible.

In such first tests, there would be noted serious drawbacks in modern house building, such as under-design or over-design. Underdesign usually occurs with new materials, such as shingles, weak roof trusses, or insufficient anchorage to a new slab base type of construction. In spite of the architect's reluctance to adapt them, various innovations are introduced in buildings, often due to sales perseverance of opportunists. These gradually find their way into home building because of performance records which they are claimed to demonstrate. Then, very often, there occur catastrophic failures due to under-design. On the other hand, over-design is the natural consequence of "good practice," based on long experience by one's self and one's predecessors in the field. For example, many home and commercial building designs have expensive features capable of withstanding extremes of weather far beyond what is reasonably required. By use of the tests of the present invention, successive improvements can be made by substituting newer, more durable materials, and also by improved construction practice to insure that no underdesign is present in the final prototype. Certain construction steps can be found to be permissibly omitted, and unnecessarily heavy weights and thicknesses of lumber and metal can be omitted to reduce unnecessary expense.

Based on such tests, a final prototype may be designed which would withstand the required accelerated testing and can, with assurance, be proposed as unaffectable by weather of the Boston area, for example, for at least 50, or possibly 100 years. Such final designs can be substantially lower in cost than current designs now in use.

Special programming of the unit of the present invention enables the prototype building to be subjected to artificial weather for periods of days and weeks which would be approximately equivalent to years and decades of normal exposure in a given climate.

The test chamber of the present invention is ideal for evaluating the weather resistance of army mobilization barracks and mess halls, for example. Let us take a problem to be solved consisting in the best possible design of such buildings for use in hot, windy southwestern climates which, for only a short time of the year, are subjected to high humidity and freeze thawing. The completed prototype buildings, assembled from standard prefabricated panels, would be subjected to high wind velocities, cyclic in velocity to 100 miles per hour, and to generally high temperatures, say up to as much as 150° F. for short periods. Under such conditions, it could be possible that no degradation or excessive stresses could be noted, nor could it be possible to optimize the programming to cause destructive forces to develop.

However, if, after such treatment, the prototype buildings were blasted suddenly with cold outdoor air pulled in through inlet 47 and ejected out of exhaust port 44, stresses and vibration could be increased rapidly. By spraying water into the cold blast, the stresses can become great enough to cause distortion and cracking. After repeated extremely hot, dry, internally-generated weather, followed by wet blasts of, say cold Chicago air, the damage to the mobilization kitchens, for example, could be complete, in that they can be blown apart. The cold thermal shock can cause sudden non-uniform contractions in panels which could also be rapidly weakened in certain parts when they become water-soaked. Resultant cracks and distortion can lead to final complete failure of the buildings. Thus, it is possible to create an artificially climatic condition not possible or probable in nature, particularly, say in the Chicago area, but which, nevertheless, is an accelerated climate to the southwestern region under study.

Such an environmental accelerator for evaluating army mobilization buildings, for example, can go a long way toward eliminating the deterioration which so promptly set in on the buildings at military installations throughout the world during, and immediately after, the last war. In addition to stores, homes and military buildings, other types of completed structures, such as garages, sheds, trailer homes and even vehicles and bridges, could be tested. The programming utilizes higher wind velocities than have been actually observed, more severe and a greater number of wind gusts, and frequent and rapid pressure changes, greater than would occur, and greater than the expected extremes of temperature in repeated cycles, and also for longer duration. Higher humidity saturation and desiccation, beyond what the records show, could be employed, and excessive and repeated rainfall, cyclic and prolonged beyond what actually could happen, and simulated solar radiation more intense than actually encountered, can be induced. However, in no case are the extremes generated so excessive as to produce improbable or unrealistic damage, or to change the character of the materials or structure to something which would never occur in service.

In other words, through programming, the radiation, wind and moisture-induced stresses are increased to achieve a degradation characteristic in the test chamber, which would take years to take place in the field. Correlation must be had with what actually happens in the field. From experience in arriving at specific programs which simulate specific climatic conditions, and which maximize the degradations of specific materials and structures, a catalogue may be accumulated which would be useful for testing new prototypes scientifically and expeditiously. Such structures then could be successfully redesigned for particular climates, based on performance, in the environmental accelerator of the present invention.

Furthermore, it is possible to occupy a prototype home while it is disposed in the aforesaid environmental accelerator, so that valuable information may be obtained regarding safety, comfort, and efficiency of the occupants under prescribed and programmed climatic conditions.

The occupants can report information regarding their observations on the effects of such accelerated environments. Likewise, heating equipment and air conditioning units can be tested under programmed weather conditions in prototype buildings of differing configurations and with varying insulation. The effect of the hot sun with hot dry versus hot moist air could be compared. The best insulation for houses against the sun in the presence of a steady, hot, moist breeze, such as that which occurs in Florida, can be determined in order to obtain maximum economy in air conditioner operation.

The aforesaid unit can, within a short time, obtain useful information concerning the durability and performance of humidity-susceptible wall partitions and finishes, such as gypsum, wall board, fiber board, plastics, and plywood, when employed in prototypes tested therein under severe climatic conditions. Likewise, furniture, drapery, carpets, electric wiring, electronic equipment such as radios and television sets, could be readily evaluated. In the case of commercial buildings, such as stores, the effect of outside weather on food, clothing, and other items, could be ascertained.

Prototypes could be deliberately assembled within the aforesaid environmental chamber during specific climatic conditions. Thus, special materials, tools, and techniques could be developed for constructing all kinds of homes, and commercial and military buildings under the severest of climatic conditions. Construction materials and final prototype designs could then be relegated to particular geographical regions with the confidence that satisfactory buildings would be erected with maximum efficiency. When prototypes begin to fail during tests in the environmental accelerator of the present invention, studies could be initiated to determine the best possible repair procedures capable of being carried out in the climate where the buildings would be constructed. Heretofore, it has not been possible to accomplish such objectives.

I claim:

1. An accelerated environmental testing unit for testing large structures, comprising, an air-tight testing chamber, of size large enough to adequately encompass a large structure to be tested, and having a roof, sides, and an air tight closeable entrance, a large air-tight duct forming a loop outside of said chamber and having its ends attached, in outside air-sealing relation, to the sides of said chamber, weather-accelerating elements mountable in the top of said chamber and designed to subject a structure under test to accelerated weather conditions, at least one blower mountable within said duct and designed to provide accelerated wind conditions for said structure, and to circulate air through said duct control means operatively connected to said weather-accelerating elements and said blower for applying artificial weather conditions to said structure, sensing means connected to said structure to sense the effects of said applied weather conditions to said structure, and feedback regulating means responsive to a signal from said sensing means and operative to regulate said weather-accelerating elements and said blower so that the applied weather conditions are varied as a function of their effect upon said structure.

2. An accelerated environmental testing unit for testing large structures, comprising, an air-tight testing chamber, of size large enough to adequately encompass a large structure to be tested, and having a roof, sides, and an air-tight closeable entrance, a large air-tight duct forming a loop outside of said chamber and having its ends attached, in outside air-sealing relation, to the sides of said chamber, weather-accelerating elements movably mountable in the top of said chamber and designed to subject a structure under test to accelerated weather conditions, at least one blower mountable within said duct and designed to provide accelerated wind conditions for said structure, and to circulate air through said duct, weather-accelerating elements mountable within said loop and designed to condition air passing through said loop to extreme climate conditions control means operatively connected to said weather-accelerating elements and said blower for applying artificial weather conditions to said structure, sensing means connected to said structure to sense the effects of said applied weather conditions to said structure, and feedback regulating means responsive to a signal from said sensing means and operative to regulate said weather-accelerating elements and said blower so that the applied weather conditions are varied as a function of their effect upon said structure.

3. An accelerated environmental testing unit for testing large structures, comprising, an air-tight testing chamber, of size large enough to adequately encompass a large structure to be tested, and having a roof, sides, and an air-tight closeable entrance, a large air-tight duct forming a loop outside of said chamber and having its ends attached, in outside air-sealing relation, to the sides of said chamber, and having a valved air inlet on one side and a valved air outlet on the other side, weather-accelerating elements movably mountable in the top of said chamber and designed to subject a structure under test to accelerated weather conditions, at least one blower mountable within said duct adjacent said chamber and designed to provide accelerated wind conditions for said structure, and to circulate air through said duct, weather-accelerating elements mountable within said loop and designed to condition air passing through said loop to extreme climate conditions, a movable base, adequate enough to hold a structure to be tested, and designed to be moved within said chamber through said entrance control means operatively connected to said weather-accelerating elements and said blower for applying artificial weather conditions to said structure, sensing means connected to said structure to sense the effects of said applied weather conditions to said structure, and feedback regulating means responsive to a signal from said sensing means and operative to regulate said weather-accelerating elements and said blower so that the applied weather conditions are varied as a function of their effect upon said structure.

4. An accelerated environmental testing unit according to claim 3 in which the weather-accelerating elements mountable on said roof include ultra violet and infra-red ray generators.

5. An accelerated environmental testing unit according to claim 4 in which the weather-accelerating elements mountable on said roof include a rain-making water spray.

6. An accelerated environmental testing unit according to claim 3 in which the weather-accelerating elements mountable within said loop include an air heater.

7. An accelerated environmental testing unit according to claim 6 in which the weather-accelerating elements mountable within said loop include an air dryer.

8. An accelerated environmental testing unit according to claim 7 in which the weather-accelerating elements mountable within said loop include an air refrigerator.

9. An accelerated environmental testing unit according to claim 8 in which the weather-accelerating elements mountable within said loop include closeable means designed to shut off at least partially, the flow of air through said duct.

10. An accelerated environmental testing unit, comprising,
a testing chamber for enclosing the structure to be tested,
weather-generating means coupled to the testing chamber to apply various artificial environmental conditions to the structure being tested,
control means connected to said weather-generating means for applying the artificial environmental conditions to the structure,
sensing means connected to the structure to sense the effects of said applied environmental conditions upon the structure, and
feedback regulating means responsive to a signal from said sensing means and operative to regulate said weather generating means so that the applied environmental conditions are varied as a function of their effect upon said structure.

11. The testing unit according to claim 10, wherein said feedback regulating means provides regenerative control of said weather-generating means in response to the effect of at least one of said environmental conditions upon said structure.

12. The testing unit according to claim 10, wherein said weather-generating means applies at least two different artificial environmental conditions to the structure to be tested, and wherein said feedback regulating means concurrently provide a regenerative regulation in response to the effect of one of said conditions to intensify the effect thereof and a degenerative regulation in response to the effect of another of said conditions to decrease the effect thereof.

References Cited
UNITED STATES PATENTS

| | | | |
|---|---|---|---|
| 1,827,530 | 10/1931 | Le Grand. | |
| 3,083,473 | 4/1963 | Luton | 73—432 X |
| 3,084,454 | 4/1963 | Schueller | 73—432 X |
| 3,224,266 | 12/1965 | Klippert | 73—150 |

OTHER REFERENCES

Instrumentation, published by Honeywell, vol, 5, No. 6, 1952, pages 4, 5, 6, 7, 34.

DAVID SCHONBERG *Primary Examiner.*